J. A. WILLIAMS.
TIRE CLAMP.
APPLICATION FILED JAN. 26, 1916.

1,300,538.

Patented Apr. 15, 1919.

Inventor:
J. A. Williams

UNITED STATES PATENT OFFICE.

JAMES A. WILLIAMS, OF BISBEE, ARIZONA.

TIRE-CLAMP.

1,300,538.  Specification of Letters Patent.  Patented Apr. 15, 1919.

Application filed January 26, 1916. Serial No. 74,508.

*To all whom it may concern:*

Be it known that I, JAMES A. WILLIAMS, a citizen of the United States, and a resident of the city of Bisbee, in the county of Cochise, State of Arizona, have invented certain new and useful Improvements in Tire-Clamps, of which the following is a specification.

This invention relates broadly to protectors for pneumatic tires and more particularly to devices for retaining the protectors in position.

The principal object of the present invention is to provide a removable covering for a pneumatic tire so that the covering may be easily attached or detached.

A further object of the present invention is the provision of devices for attaching a tire covering wherein the devices are sufficiently strong to withstand severe road shocks at the same time easily and quickly secured in position upon a wheel.

A still further object of the present invention is to provide attaching members to secure a tire protector in position and wherein the attaching members may be removed from a worn out protector and attached to a new protector without destructive effort.

Other and further objects of the present invention will in part be obvious and will in part be pointed out hereinafter in the specification following by reference to the accompanying drawings wherein like parts are represented by like characters throughout the several figures thereof.

Figure 1:
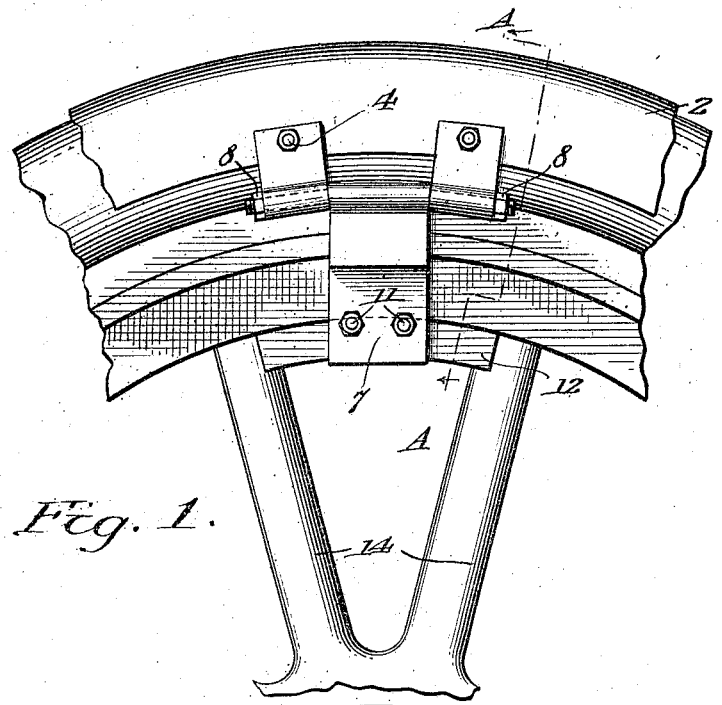
Figure 2:
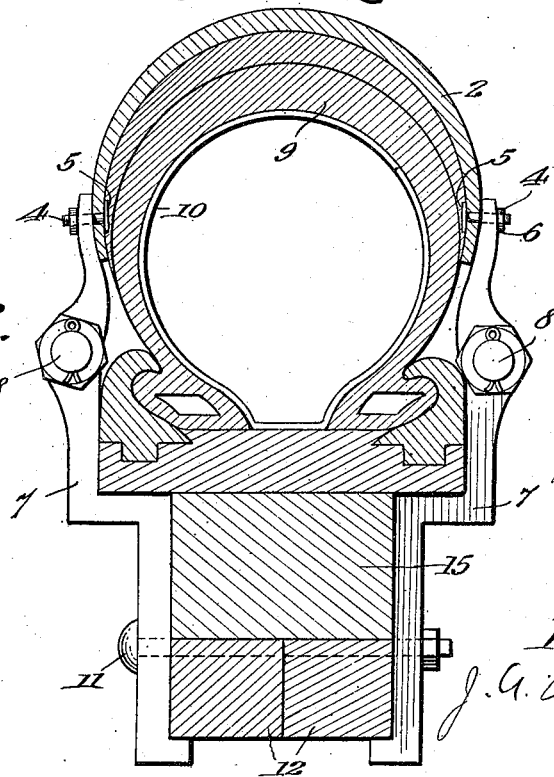

Figure 1 is a detail view illustrating a portion of a protector and a side elevational view of the attaching members. Fig. 2 is a section taken on line A—A of Fig. 1.

One of the undesirable features of pneumatic tires is the liability of said tire to puncture, and another thing to be considered is the life of a pneumatic tire due to wear at the tread portion of the tire. Many attempts have been made to provide armor of various characters for tires, and many types of over-shoes or casings have been invented.

A very effective type of wear or over-shoe is formed by utilizing old and badly worn casings, which are secured in position over a casing which forms the sustaining member for the inner tube. Obviously the life of the sustaining member is materially increased by the thickness of the old shoe which must be worn out before the sustaining casing can be worn.

One of the most difficult problems in connection with over-shoes is the provision of suitable securing means wherein the casing is fixedly secured in position over the tire, and it is to this end that the present invention particularly relates. It is desirable that the attaching means be of sufficient strength to insure holding the over-shoe in position under severe conditions of use and at the same time permit the casing or shoe to be changed when the same is badly worn. Sufficient movement must be allowed to the attaching means to compensate for movement of the tire as it rotates, in contact with the ground, under load.

Referring now particularly to the drawings, my invention comprises anchor plates 1 which are secured to a casing or shoe 2 preferably by means of small stub bolts 4 which are provided with flat heads 5 that are adapted to lie on the inner side of the shoe 2 and are provided with nuts 6 which enable the shoe 2 to be detached from the anchor plates 1 whenever the shoe is badly worn, and also to enable a new shoe to be secured to the same fastening devices. The anchor plates 1 are pivoted on each side of brackets 7 by means of pivot bolts 8 so that the anchor plates 1 may swing in and out as the tire 9 and inner tube 10 move as the wheel rotates under load. The brackets 7 are formed to conform to a standard rim and are secured to the felly by means of bolts 11 which pass through the brackets 7 and also through the filler blocks 12, which exactly fill the spaces between spokes 14 of the wheel, and these filler blocks are curved to fit very close to the felly 15 of the wheel. It will be seen that by removing the bolts 11 the filler blocks 12 may be removed and the brackets 7 swung to or from the sides of the felly due to the pivoted mountings 8, thereby enabling the entire device to be easily and quickly attached to or removed from the wheel.

Having thus described my invention what I claim is:—

In a device of the class described the combination of an overshoe for a pneumatic tire, anchor plates secured to the overshoe and located at the opposite edges thereof, brackets pivoted to the anchor plates and arranged to swing transversely of the wheel, filler blocks of a length to extend across the space between two of the spokes of the wheel and fit against the said spokes, and fastening devices piercing the filler blocks and the brackets and securing the same together and to the wheel.

JAMES A. WILLIAMS.

Copies of this patent may be obtained for five cents each, by addressing the "Commissioner of Patents, Washington, D. C."